(12) United States Patent
Oguchi (10) Patent No.: US 11,746,469 B2
(45) Date of Patent: Sep. 5, 2023

(54) FIBER STRUCTURE MANUFACTURING APPARATUS AND FIBER STRUCTURE MANUFACTURING METHOD

(71) Applicant: SEIKO EPSON CORPORATION, Tokyo (JP)

(72) Inventor: Yuki Oguchi, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 162 days.

(21) Appl. No.: 17/331,708

(22) Filed: May 27, 2021

(65) Prior Publication Data

US 2021/0372047 A1 Dec. 2, 2021

(30) Foreign Application Priority Data

May 29, 2020 (JP) ................. 2020-093993

(51) Int. Cl.
| | | |
|---|---|---|
| *D21B 1/08* | (2006.01) | |
| *B02C 7/16* | (2006.01) | |
| *B02C 23/28* | (2006.01) | |
| *D21G 1/02* | (2006.01) | |
| *B02C 25/00* | (2006.01) | |

(52) U.S. Cl.
CPC ................. *D21B 1/08* (2013.01); *B02C 7/16* (2013.01); *B02C 23/28* (2013.01); *B02C 25/00* (2013.01); *D21G 1/0253* (2013.01)

(58) Field of Classification Search
CPC ........... B02C 7/16; B02C 23/28; B02C 25/00; D21B 1/08; D21G 1/0253
USPC ....................................................... 162/201
See application file for complete search history.

(56) References Cited

U.S. PATENT DOCUMENTS 5,564,635 A 10/1996 Terada et al.
2021/0355604 A1* 11/2021 Gomi ..................... B32B 5/022

FOREIGN PATENT DOCUMENTS

| JP | H07-104293 A | 4/1995 |
| JP | H07-157989 A | 6/1995 |

* cited by examiner

*Primary Examiner* — Mark Halpern
(74) *Attorney, Agent, or Firm* — Global IP Counselors, LLP (57) ABSTRACT

A fiber structure manufacturing apparatus that includes: a defibration unit that pulverizes and defibrates a raw sheet material that contains fibers; a transportation unit that transports a defibrated material after defibration by the defibration unit; a forming unit that forms a fiber structure from the defibrated material transported by the transportation unit; a temperature acquisition unit that acquires a temperature inside the defibration unit; and a control unit that controls a mass flow of gas that contains the defibrated material transported from the defibration unit in accordance with the temperature acquired by the temperature acquisition unit.

7 Claims, 4 Drawing Sheets

FIBER STRUCTURE MANUFACTURING APPARATUS AND FIBER STRUCTURE MANUFACTURING METHOD

The present application is based on, and claims priority from JP Application Serial Number 2020-093993, filed May 29, 2020, the disclosure of which is hereby incorporated by reference herein in its entirety.

BACKGROUND

1. Technical Field

Embodiments of the present disclosure relate to a fiber structure manufacturing apparatus and a fiber structure manufacturing method based on dry-type fiber processing technology using as little water as possible.

2. Related Art

So-called wet-type recycling technology has been used for the recycling of waste paper put out from offices, etc. In a wet-type recycling method, waste paper is supplied into water, is defiberized by means of, mainly, a mechanical action, and is then reproduced into paper form. Since such a wet-type recycling method requires a huge amount of water, it is necessary to increase the scale of processing in order to produce recycled paper inexpensively. Therefore, in wet-type recycling, a huge amount of waste paper is indispensable, a lot of labor is required for maintenance of water processing facilities, and, moreover, energy needed in a drying process is inevitably large.

On another aspect, since documents containing confidential information are also put out as waste paper from offices, there are demands for a solution for self-recycling waste paper in the own offices internally for a security reason. However, it is difficult to satisfy quantity requirements needed for large-scale recycling processing mentioned above because the amount of waste paper put out from a small office is small. Moreover, it is unrealistic to install large-scale recycling facilities mentioned above on the site of the office. In an effort to overcome these difficulties, for paper recycling, dry-type paper defibration techniques using as little water as possible are disclosed in, for example, JP-A-7-157989 and Japanese Patent No. 3,380,010.

JP-A-7-157989 and Japanese Patent No. 3,380,010 disclose a defibrator that defibrates waste paper (a sheet-type fibrous raw material that contains fibers). The disclosed defibrator generates airflow (for example, a flow of air) by rotating a centrifugal impeller, carries shredded pieces of waste paper by the airflow, and performs suction and defibration and then discharges the defibrated material. However, the force of transporting the waste paper as a material by the airflow is not constant because the density of air fluctuates depending on the temperature and, therefore, in related art, it is difficult to suck, defibrate, and discharge the material stably.

SUMMARY

A fiber structure manufacturing apparatus according to a certain aspect of the present disclosure includes: a defibration unit that pulverizes and defibrates a raw sheet material that contains fibers; a transportation unit that transports a defibrated material after defibration by the defibration unit; a forming unit that forms a fiber structure from the defibrated material transported by the transportation unit; a temperature acquisition unit that acquires a temperature inside the defibration unit; and a control unit that controls a mass flow of gas that contains the defibrated material transported from the defibration unit in accordance with the temperature acquired by the temperature acquisition unit.

The control unit may increase the mass flow of the gas that contains the defibrated material transported from the defibration unit when the temperature acquired by the temperature acquisition unit is higher than a predetermined temperature.

The defibration unit may include a rotor that has rotary blades and a stator that has stationary blades and is provided around the rotor, and the control unit may control a number of revolutions of the rotor.

The forming unit may include a dispersion mechanism that disperses the defibrated material transported by the transportation unit in a gaseous atmosphere, a suction mechanism that sucks the defibrated material dispersed by the dispersion mechanism, and a mesh belt that transports the defibrated material sucked by the suction mechanism, and the control unit may control a suction force applied by the suction mechanism.

The temperature acquisition unit may measure the temperature inside the defibration unit.

Based on a measurement value of a temperature at an entrance of the defibration unit and a measurement value of a temperature at an exit of the defibration unit, the temperature acquisition unit may acquire the temperature inside the defibration unit.

Based on a flow rate of the gas at an exit of the defibration unit, the temperature acquisition unit may acquire the temperature inside the defibration unit.

A fiber structure manufacturing method according to a certain aspect of the present disclosure includes: acquiring a temperature inside a defibration unit; controlling, in accordance with the acquired temperature, a mass flow of gas that contains a defibrated material that is transported; pulverizing and defibrating a raw sheet material that contains fibers; transporting, by a transportation unit, the defibrated material after defibration; and forming a fiber structure from the defibrated material transported by the transportation unit.

As stated above, a fiber structure manufacturing apparatus and a fiber structure manufacturing method according to a certain aspect of the present disclosure controls the mass flow of gas that contains a defibrated material transported from a defibration unit in accordance with a temperature inside the defibration unit. Therefore, it is possible to reproduce a high-quality fiber structure that is in a good defibrated state.

DESCRIPTION OF EXEMPLARY EMBODIMENTS

Figure 1:
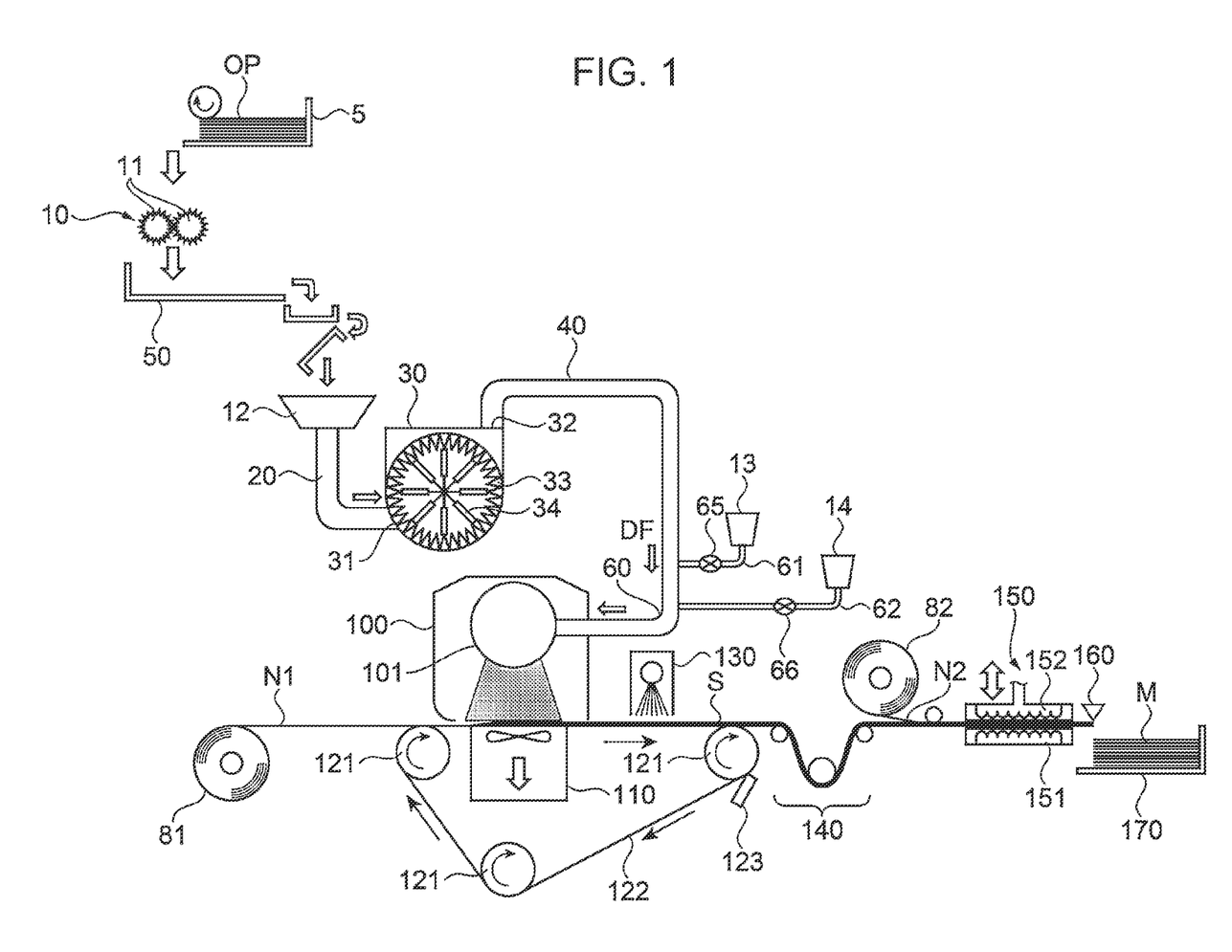
FIG. 1 is a schematic diagram illustrating a schematic configuration of a fiber structure manufacturing apparatus according to an exemplary embodiment of the present disclosure.

With reference to the accompanying drawings, embodiments of the present disclosure will now be explained. FIG.

1 is a schematic diagram illustrating a schematic configuration of a fiber structure manufacturing apparatus according to an exemplary embodiment of the present disclosure. The fiber structure manufacturing apparatus according to the present embodiment is based on a recycling technique of, for example, reproducing a formed product of a new fiber structure from a raw sheet material containing fibers (for example, waste paper) through a dry process using as little water as possible.

A manufactured fiber structure can be used as sound-absorbing materials, which absorb sound, and cushioning materials (packing materials), which absorb external shock. The fiber structure functioning as a sound-absorbing material, when provided inside various home appliances, for example, is able to reduce leakage of operating noise to the outside of the appliances. The uses of the fiber structure are not limited to home appliances. For example, the fiber structure can be used also for various construction materials, or sound-absorbing materials to be installed in concert halls for acoustic control, etc.

What is mainly expected to be used as a fiber-containing raw sheet material OP (for example, waste paper) to be supplied to the fiber structure manufacturing apparatus according to the present embodiment is office waste paper whose recycling routes are yet to be sufficiently established, for example, general waste paper of A4 size, which is currently widely used in offices, confidential office document waste paper, etc. However, not only such office waste paper but also corrugated cardboard and newspaper can be used. Such a raw sheet material OP containing fibers (for example, waste paper) is supplied to a coarse crusher 10 of the fiber structure manufacturing apparatus. The raw sheet material OP containing fibers is shredded into pieces of several centimeters square by coarse crushing blades 11 of the coarse crusher 10. The coarse crusher 10 having such a shredding function may be preferably equipped with an automatic feed mechanism 5 for continuously supplying the raw sheet material OP containing fibers. With productivity considered, the higher the supply speed of the automatic feed mechanism 5, the better.

The coarse crushing blades 11 of the coarse crusher 10 may be configured as a device whose cutting width is made greater in comparison with the blades of a common shredder. Coarsely crushed pieces (paper pieces) after shredding into the size of several centimeters square by the coarse crushing blades 11 may be supplied to a defibrating process, which is a subsequent process, via a metering feeder 50, a hopper 12, and a coarsely crushed piece (paper piece) inlet pipe 20.

The metering feeder 50 may use any method as long as a fixed amount of coarsely crushed pieces (paper pieces) are supplied to a defibrator. A vibrating feeder is a preferred example.

A vibrating feeder tends to fail to transport a constant amount of pieces of paper when the coarsely crushed piece (paper piece) is light in weight due to the effect of, for example, static electricity. Therefore, preferably, pieces of paper that is light in weight may be formed into a block-like shape by performing multi-feeding at the coarse crusher 10 in the preceding process. The weight of each block may be preferably 0.5 g to 2 g.

Coarsely crushed pieces (paper pieces) may be continuously supplied from the coarse crusher 10 to the vibrating feeder or may be temporarily stored in a flexible container bag and then supplied therefrom to the vibrating feeder. In the latter case, the flexible container bag functions as a buffer, and thus it is possible to reduce the influence of fluctuations in the amount of collected waste paper supplied as the raw sheet material OP on the manufacturing apparatus. Preferably, an amount of coarsely crushed pieces (paper pieces) supplied from the flexible container bag should be enough for continuous fiber structure production for about one hour or so, although it depends on the amount of production. If a large amount of coarsely crushed pieces (paper pieces) are supplied from the flexible container bag to the vibrating feeder at a time, the vibration of the vibrating feeder will be affected; therefore, it will be advantageous if coarsely crushed pieces are supplied from the flexible container bag little by little. Examples of a method for supplying the coarsely crushed pieces little by little include tilting the flexible container bag, shaking the flexible container bag by means of, for example, a motor, and prodding a part of the flexible container bag with an air cylinder.

The coarsely crushed piece (paper piece) inlet pipe 20 is in communication with an inlet 31 of a defibrator 30, which is an example of a defibration unit. The coarsely crushed pieces (paper pieces) fed into the defibrator 30 through the inlet 31 are defibrated between a rotating rotor 34 and a stator 33. The defibrator 30 has a mechanism for generating a flow of air. Fibers defibrated in a gaseous atmosphere (for example, in air), that is, a defibrated material DF, are carried by such airflow from an outlet 32 to a transport pipe 40.

A specific example of the defibrator 30 will now be described. For example, a disc refiner, a turbo mill (manufactured by FREUND-TURBO CORPORATION), a Ceren Miller (manufactured by MASUKO SANGYO CO., LTD), or a wastepaper defibrator including a wind generating mechanism such as one disclosed in JP-A-6-93585, etc. can be used as the defibrator 30. The size of the coarsely crushed pieces (paper pieces) supplied to such a defibrator 30 may be the general size of shredded pieces of paper outputted from a common shredder. With the strength of a manufactured fiber structure (for example, recycled paper) considered and with supply to the defibrator 30 considered, however, it will be desirable if the coarsely crushed pieces (paper pieces) discharged from the coarse crusher 10 have shredded size of several centimeters square.

In the defibrator 30 including a wind generating mechanism, coarsely crushed pieces (paper pieces) are sucked in through the inlet 31 by using an airflow self-generated by the defibrator 30, together with the airflow, and are then defibrated and transported toward the outlet 32. The defibrator 30 defibrates supplied coarsely crushed pieces (paper pieces) into cotton-like form. For example, an Impeller Mill 250 (manufactured by Seishin Enterprise Co., Ltd.), which is a turbo-mill-type impeller mill, is capable of generating an airflow having an airflow volume of approximately 3 m$^3$/min at 8,000 rpm (peripheral speed of approximately 100 m/s) by using twelve blades installed at the outlet side. In this case, the airflow velocity at the part closer to the inlet 31 is approximately 4 m/s, and coarsely crushed pieces (paper pieces) are carried into the defibrator 30 by the airflow. The coarsely crushed pieces (paper pieces) carried into the defibrator 30 are defibrated between the blades rotating at high velocity and the stator 33 and are then discharged from the outlet 32. The discharge velocity is approximately 6.5 m/s for a discharge pipe diameter of φ100.

If the defibrator 30 that does not include a wind generating mechanism is used, a blower, etc. configured to generate a flow of air that guides coarsely crushed pieces (paper pieces) into the inlet 31 is provided separately.

In the defibrating process by the defibrator 30, it is preferable to defibrate pulp into fibrous form until coarsely crushed pieces (paper pieces) lose their shape because such shape-losing defibration eliminates unevenness of the fiber structure to be formed in a subsequent process. In this process, for example, printed ink or toner, and coating and additive materials for paper (papermaking chemicals), such as a bleed prevention agent, are also pulverized into grains of several tens of micrometers or less (hereinafter referred to as ink grains and papermaking chemicals). Therefore, the output from the defibrator 30 is the defibrated material DF that includes fibers, ink grains, and papermaking chemicals obtained by defibrating the coarsely crushed pieces (paper pieces).

In this embodiment, a disc refiner is used as the defibrator 30. The defibrator 30 has rotary blades in the radial direction of the rotor 34. The defibrator 30 has stationary blades on the stator 33 provided around the rotor 34. The gap between the rotary blades on the rotor 34 and the stationary blades on the stator 33 is preferably kept to be approximately equal to the thickness of a paper piece, for example, approximately 100 μm to 150 μm. This configuration causes the defibrated fibers DF to move to the outer circumference by the flow of air generated by the rotary blades and then to be discharged from the outlet 32.

The defibrated fibers DF discharged from the defibrator 30 (φ100, sectional area of approximately 78 cm$^2$) are sent to a fiber structure forming machine 100 through the transport pipe 40 and a transport pipe 60, which constitute an example of a transportation unit.

The transport pipe 60 is connected to a melting-material transport pipe 61.

A melting material is supplied from a hopper 13. The amount of the melting material is controlled by the melting-material control valve 65. The melting material whose amount is controlled is supplied to the transport pipe 60 through the melting-material transport pipe 61 and is able to be mixed into the defibrated fibers DF transported through the transport pipe 60.

The accuracy of an amount of transportation can be increased by measuring an amount of weight reduction at the metering feeder 50 and controlling the opening degree of the melting-material control valve 65 based on it.

The pipe diameter of the melting-material transport pipe 61 may be preferably smaller than the pipe diameter of the transport pipe 60. This is because the velocity of an airflow increases and it becomes easier for the melting material to disperse in the airflow.

The melting material maintains the strength of the fiber structure as a formed product produced from the defibrated fibers DF and contributes to preventing dispersion of paper dust and fibers. The melting material is added to the defibrated fibers DF and is fusion-bonded to the defibrated fibers DF by being heated. The melting material may be any material, such as a fibrous material or a powder material, as long as the material is melted by a heating process. Materials that melt at 200° C. or lower are preferred examples because paper yellowing or the like does not occur. Materials that melt at 160° C. or lower are more preferred examples in terms of energy.

The melting material may preferably contain a thermoplastic resin that melts during heat forming. Fibrous melting materials that are easily intertwined with cotton-like fibers of the defibrated fibers DF will be advantageous for producing low-density products. Preferably, composite fibers having a core-in-sheath structure may be used. Melting materials having a core-in-sheath structure are preferable because a sheath portion exhibits an adhesive function when melted at a low temperature and because a core portion remains in fibrous form to retain the shape. It is preferable to use, for example, ETC and INTACK series, which are manufactured by ES FIBERVISIONS, Inc., or Tetoron (registered trademark), which is a polyester fiber for dry non-woven fabric and is manufactured by TEIJIN FIBERS LIMITED.

The fiber fineness of the melting material may be preferably 0.5 dtex or more and 2.0 dtex or less. If the value of the fiber fineness is greater than 2.0 dtex, it is not possible to achieve sufficient adhesive strength between a first sheet N1, or a second sheet N2, and a defibrated-cotton sheet S formed by accumulation of the defibrated fibers DF. If the value of the fiber fineness is less than 0.5 dtex, for example, problems may arise in that the position of a core deviates from the center of a sheath in a core-in-sheath structure of a fiber, and it is difficult to discharge the fibers linearly. Another problem is that, because of a smaller diameter than that of the defibrated fibers DF, it is more susceptible to the effect of static electricity during manufacturing, and the melting fibers and the defibrated fibers will be mixed unevenly, etc.

The fiber length of the melting material may be preferably about 1 to 10 mm. The reasons are as follows. If the fiber length of the melting material is less than 1 mm, it is difficult to retain the shape of the fiber structure due to insufficient adhesive strength. If the fiber length of the melting material is greater than 10 mm, fibers will be formed into balls in airflow, resulting in poorer dispersion of the fibers.

A functional-material transport pipe 62 is connected to the transport pipe 60 at a position downstream of a position where the melting-material transport pipe 61 is connected to the transport pipe 60.

A powder fire retardant is preferably usable as a compound used in the fiber structure. The powder fire retardant is supplied as a functional material from a hopper 14. The amount of the powder fire retardant is controlled by a functional-material control valve 66. The powder fire retardant whose amount is controlled is supplied to the transport pipe 60 through the functional-material transport pipe 62. Inside the transport pipe 60, the powder fire retardant is able to be mixed into the defibrated fibers DF into which the melting material has been mixed while being transported.

The accuracy of an amount of transportation can be increased by measuring an amount of weight reduction at the metering feeder 50 and controlling the opening degree of the functional-material control valve 66 based on it.

The pipe diameter of the functional-material transport pipe 62 may be preferably smaller than the pipe diameter of the transport pipe 60. This is because the velocity of an airflow increases and it becomes easier for the functional material to disperse in the airflow.

The fire retardant is added so as to impart incombustibility to a defibrated-cotton sheet S when the defibrated-cotton sheet S is formed by accumulation of the defibrated fibers DF. For example, hydroxides such as aluminum hydroxide and magnesium hydroxide, boric acid, boric acid compounds such as ammonium borate, phosphorus-based organic materials containing, for example, ammonium polyphosphate or phosphoric esters, or nitrogenous compounds such as melamine and isocyanurate are usable for the fire retardant. Among them, it is preferable to use a composite containing melamine and phosphoric acid.

Preferably, the fire retardant may be a solid fire retardant. The average particle diameter of the solid fire retardant may be preferably 1 μm or more and 50 μm or less. If the average particle diameter is less than 1 μm, transportation by airflow will become difficult when the defibrated fibers DF are accumulated so as to form a defibrated-cotton sheet S later. If the average particle diameter is greater than 50 μm, the adhesive power of the solid fire retardant to fibers is reduced, and thus the solid fire retardant is likely to come off the fibers. Since this causes uneven adhesion to the defibrated fibers DF, the solid fire retardant will be unable to fulfill its fire retardant function enough.

In the present embodiment, the defibrated fibers DF transported through the transport pipe 40 and the transport pipe 60 are formed into a fiber structure M by a forming unit that includes the fiber structure forming machine 100 and a mesh belt 122. The fiber structure forming machine 100 includes a forming drum 101, which operates as a dispersion mechanism, and a suction device 110, which operates as a suction mechanism.

First, the defibrated fibers DF into which the melting material and the functional material have been mixed through the transport pipe 60 are fed into the fiber structure forming machine 100.

The first sheet N1 is supplied from a first sheet supply roller 81 to the fiber structure forming machine 100. The first sheet N1 supplied from the first sheet supply roller 81 serves as a base for a bottom surface (first surface) of the defibrated-cotton sheet S formed by the fiber structure forming machine 100.

Both woven fabric and nonwoven fabric can be used as the first sheet N1 as long as the first sheet N1 is permeable to air. Since the first sheet N1 is permeable to air, an airflow generated by the suction device 110 can act through the first sheet N1 and, therefore, a mixed defibrated material that is a mixture of the defibrated fibers DF, the melting material, and the functional material accumulates on the first sheet N1 properly. Due to the suction by the suction device 110, the additives in waste paper and the print ink grains pulverized by the defibrator 30 are removed from the mixed defibrated material. The size of the mesh opening of the sheet may be preferably 100 μm or less. The first sheet N1 may be colored because it constitutes an exterior portion of the fiber structure M. In the present embodiment, ecule (registered trademark) 3151A, which is a polyester filament nonwoven fabric manufactured using a spunbonding method by TOYOBO CO., LTD., is used as the first sheet N1 having air permeability.

The fiber structure forming machine 100 will now be schematically described. The fiber structure forming machine 100 includes the dispersion mechanism configured to uniformly disperse the defibrated fibers DF in a gaseous atmosphere, for example, in air, and the suction mechanism configured to suck the dispersed defibrated fibers DF onto the mesh belt 122.

The dispersion mechanism includes the forming drum 101. The mixed defibrated material and mix gas (mix air) are simultaneously supplied into the forming drum 101 that rotates. A small-hole screen is provided on a surface of the forming drum 101. The mixed defibrated material, that is, the defibrated fibers DF into which the melting material and the functional material have been mixed, is discharged from the small-hole screen. The hole diameter and the hole shape of the small-hole screen of the forming drum 101 are not specifically limited. An elongated hole of approximately 5 mm×25 mm will be advantageous for achieving both productivity and uniformity, although such a preferred hole diameter and a preferred hole shape depend on the size of the mixed defibrated material.

The mix gas (air) blends the defibrated fibers DF, the melting material, and the functional material for homogenization and causes the mixture to pass through the small-hole screen of the forming drum 101.

Current plates are provided below the forming drum 101. With the current plates, it is possible to adjust the uniformity, in the width direction, of the mix gas and the mixed defibrated material having passed through the small-hole screen of the forming drum 101. The mesh belt 122 stretched between a plurality of tension rollers 121 is provided below the current plates. The mesh belt 122 is an endless belt having a mesh structure. The suction device 100 sucks the transport gas (transport air) and the mix gas (mix air) through the mesh belt 122. The amount of gas sucked by the suction device 100 is set to be larger than the sum of the amount of the transport gas and the amount of the mix gas. By this means, it is possible to prevent materials and paper dust generated during defibration from being blown off. Since fine powders (waste powders) having passed through the first sheet N1 and the mesh belt 122 are contained in the suction gas, it is preferable to provide a cyclone-type dust collector or a filter-type dust collector downstream in order to separate the fine powders (waste powders) therefrom.

The mesh belt 122 is configured to move in the direction indicated by the arrows in FIG. 1 by drive rotation of at least one of the plurality of tension rollers 121 under the fiber structure forming machine 100. Dust, etc. on a surface of the mesh belt 122 is removed by a cleaning blade 123, which is in contact with the mesh belt 122. The mesh belt 122 may be cleaned using air.

The mesh belt 122 may be made of any material such as metal or resin as long as a sufficient amount of suction air is able to pass through the mesh belt 122 and in addition as long as the mesh belt 122 has sufficient strength to hold materials. If the hole diameter of the mesh is excessively large, a sheet surface will be formed into an irregular surface shape when a defibrated-cotton sheet S is formed. In order to avoid such surface irregularities, the hole diameter of the mesh is preferably approximately 60 μm to 125 μm. If the hole diameter of the mesh is less than 60 μm, it is difficult to form a stable flow of air by the suction device 110.

The first sheet N1 is supplied onto the mesh belt 122 from the first sheet supply roller 81 at a moving velocity that is the same as the moving velocity of the mesh belt 122. The suction device 110 includes an airtight box having a window having a desired size provided under the mesh belt 122 and sucks gas (for example, air) through a part of the box other than the window to reduce internal pressure inside the box or to put the inside of the box into a low vacuum state. By this means, it is possible to suck the defibrated fibers DF through the window and cause the defibrated fibers DF to accumulate on the mesh belt 122.

In the configuration described above, the defibrated fibers DF transported through the transport pipe 60 are fed into the fiber structure forming machine 100 for forming a fiber structure. The defibrated fibers DF pass through the small-hole screen on the surface of the forming drum 101 and accumulate on the first sheet N1 on the mesh belt 122 due to the suction force applied by the suction device 110. In this process, since the mesh belt 122 and the first sheet N1 are moved, it is possible to produce a uniform sheet-like accumulation of the mixed defibrated material containing the defibrated fibers DF on the first sheet N1, thereby forming a defibrated-cotton sheet S that is a fibrous web. The defibrated-cotton sheet S containing the defibrated fibers DF is heated and pressed to be formed into a fiber structure M having a sheet-like shape.

In the fiber structure forming machine 100, the density of the fiber structure M to be produced is determined by the amount of accumulation of the mixed defibrated material and by a subsequent heating-and-pressing process. For example, the mixed defibrated material is accumulated to a height of approximately 40 to 60 mm in order to obtain the fiber structure M having, for example, a thickness of approximately 10 mm and a density of approximately 0.1 g/cm$^3$ to 0.15 g/cm$^3$.

In the present embodiment, for the purpose of mixing the melting material and the fire retardant into the defibrated fibers DF transported through the transport pipe 60, the melting-material transport pipe 61 and the functional-material transport pipe 62, through which the respective materials are supplied separately, are connected to the transport pipe 60. However, the melting material and the functional material may be mixed, and the materials after the mixing may be supplied through one transport pipe connected to the transport pipe 60 through which the defibrated fibers DF are transported. Such a transport pipe may be provided in the fiber structure forming machine 100. If such a configuration is adopted, for example, the melting material and the fire retardant whose amounts are metered are mixed in the forming drum 101.

It is possible to impart incombustibility to the formed fiber structure M by providing a liquid atomizer 130 and by adding a water-soluble fire retardant functioning as a functional material (for example, APINON-145 manufactured by SANWA CHEMICAL CO., LTD.) to liquid atomized by the liquid atomizer 130.

A second sheet N2 is supplied from a second sheet supply roller 82 to a subsequent process after the processes performed by the fiber structure forming machine 100 and the liquid atomizer 130. The second sheet N2 supplied from the second sheet supply roller 82 becomes a cover of an upper surface (second surface) of the defibrated-cotton sheet S formed by the fiber structure forming machine 100.

Both woven fabric and nonwoven fabric can be used as the second sheet N2. In the present embodiment, similarly to the first sheet N1, ecule (registered trademark) 3151A, which is a polyester filament nonwoven fabric manufactured using a spunbonding method by TOYOBO CO., LTD., is used as the second sheet N2.

In the present embodiment, the first sheet N1 is supplied from the first sheet supply roller 81 to the fiber structure forming machine 100, and, after the defibrated-cotton sheet S is formed on the first sheet N1, the second sheet N2 is supplied from the second sheet supply roller 82 so as to cover the upper surface of the defibrated-cotton sheet S.

Alternatively, the first sheet supply roller 81 and the second sheet supply roller 82 may be provided in a section after (downstream of) the fiber structure forming machine 100, and the defibrated-cotton sheet S formed by the fiber structure forming machine 100 may be then sandwiched between the first sheet N1 and the second sheet N2.

The defibrated-cotton sheet S whose second surface is covered by the second sheet N2 supplied from the second sheet supply roller 82 is transported to a heating-and-pressing mechanism 150. The heating-and-pressing mechanism 150 sandwiches the defibrated-cotton sheet S, which is a transported object, between a first substrate 151 and a second substrate 152 configured to move up and down, and performs hot pressing through which the defibrated-cotton sheet S is simultaneously heated and pressed. Each of the first substrate 151 and the second substrate 152 includes a built-in heater. With this configuration, it is possible to heat the defibrated-cotton sheet S sandwiched between the first substrate 151 and the second substrate 152.

The defibrated-cotton sheet S is pressed and heated by the heating-and-pressing mechanism 150. As a result, the melting material mixed in the defibrated-cotton sheet S is heated and becomes bonded tightly to the defibrated fibers DF. The fiber structure M is formed in this way. The heating-and-pressing process contributes to keeping the strength and shape of the fiber structure M and to preventing dispersion of fibers from the fiber structure M.

The melting material melts when heated and then solidifies when cooled. As a result of the melting and solidifying of the melting material, the first sheet N1 becomes bonded to the defibrated-cotton sheet S on the first surface of the defibrated-cotton sheet S, and the second sheet N2 becomes bonded to the defibrated-cotton sheet S on the second surface of the defibrated-cotton sheet S.

Moreover, since the defibrated-cotton sheet S is pressed and heated by the heating-and-pressing mechanism 150, the strength of the fiber structure M further improves.

Although a heating process and a pressing process may be performed separately, it is preferable to simultaneously heat and press the defibrated-cotton sheet S. Preferably, heating time should be long enough for the rising of temperature so as to cause the melting of the melting material near the core of the defibrated-cotton sheet S.

Since heating and pressing is performed as a batch process, in order to secure sufficient heating time, it is preferable to provide a buffer 140 in a section before the heating-and-pressing mechanism 150.

In the present embodiment, the defibrated-cotton sheet S with the first sheet N1 arrives at the buffer 140 after the forming of the defibrated-cotton sheet S on the first sheet N1 but before the forming of the second sheet N2 on the second surface of the defibrated-cotton sheet S. The buffer 140 can be realized by moving up and down a so-called dancer roller (bridge roller) 141. The position where the buffer 140 is provided is not limited to this example. For example, the buffer 140 may be provided at a position where the defibrated-cotton sheet S with the first sheet N1 and the second sheet N2 arrives after the forming of the defibrated-cotton sheet S on the first sheet N1 and, in addition, after the forming of the second sheet N2 on the second surface of the defibrated-cotton sheet S.

After the completion of heating and pressing by the heating-and-pressing mechanism 150, it is necessary to move the fiber structure M quickly and then set the next defibrated-cotton sheet S, which is the next material to be heated and pressed. For this purpose, it is preferable to provide a mechanism for inserting a crochet needle into the exit of the heating-and-pressing process to hold and draw out the fiber structure M. More preferably, the mechanism may have a cleaning function because there is a possibility of adhesion of fibers to the surfaces of the first substrate 151 and the second substrate 152 configured to apply heat and pressure. For example, it is conceivable to use a method of reeling a sheet made of polytetrafluoroethylene (PTFE), etc. at predetermined time intervals. When the fiber structure manufacturing apparatus is not in operation, the heating-and-pressing mechanism 150 is retracted by moving in a direction intersecting with the transport direction.

In the present embodiment, the heating-and-pressing mechanism 150 is made up of the first substrate 151 and the second substrate 152 configured to move up and down. However, the heating-and-pressing mechanism 150 may be made up of heating-and-pressing rollers. Since heating-and-pressing rollers make it possible to perform continuous forming, this configuration makes it possible to omit the buffer 140.

A sheet of the fiber structure M obtained through the recycling process described above is cut into a desired size and shape by a cutter 160. The cut sheets are stacked as a whole fiber structure on, for example, a stacker 170 and are cooled. For example, an ultrasonic cutter can be preferably used as the cutter 160. Cutting by such an ultrasonic cutter may be performed in a width direction of the fiber structure M or may be performed reciprocally in one direction and the other direction that is the opposite of the one direction along the width direction. A rotary cutter or an octagonal rotary cutter may be used instead of an ultrasonic cutter. The whole fiber structure is then cut with, for example, a Thomson die and is formed into a desired size and shape to form a recycled fiber structure. The recycled fiber structure can be suitably used as, for example, sound-absorbing materials, which absorb sound, cushioning materials (packing materials), which absorb shocks (external force), and materials for forming dies, etc.

Next, regarding the control of the defibrator 30 described above, first to fourth embodiments will now be described with examples.

In the first embodiment, in accordance with a temperature inside the defibrator 30, a control unit that is not illustrated controls the mass flow of gas (air) that contains the defibrated fibers DF transported from the defibrator 30.

Figure 2:
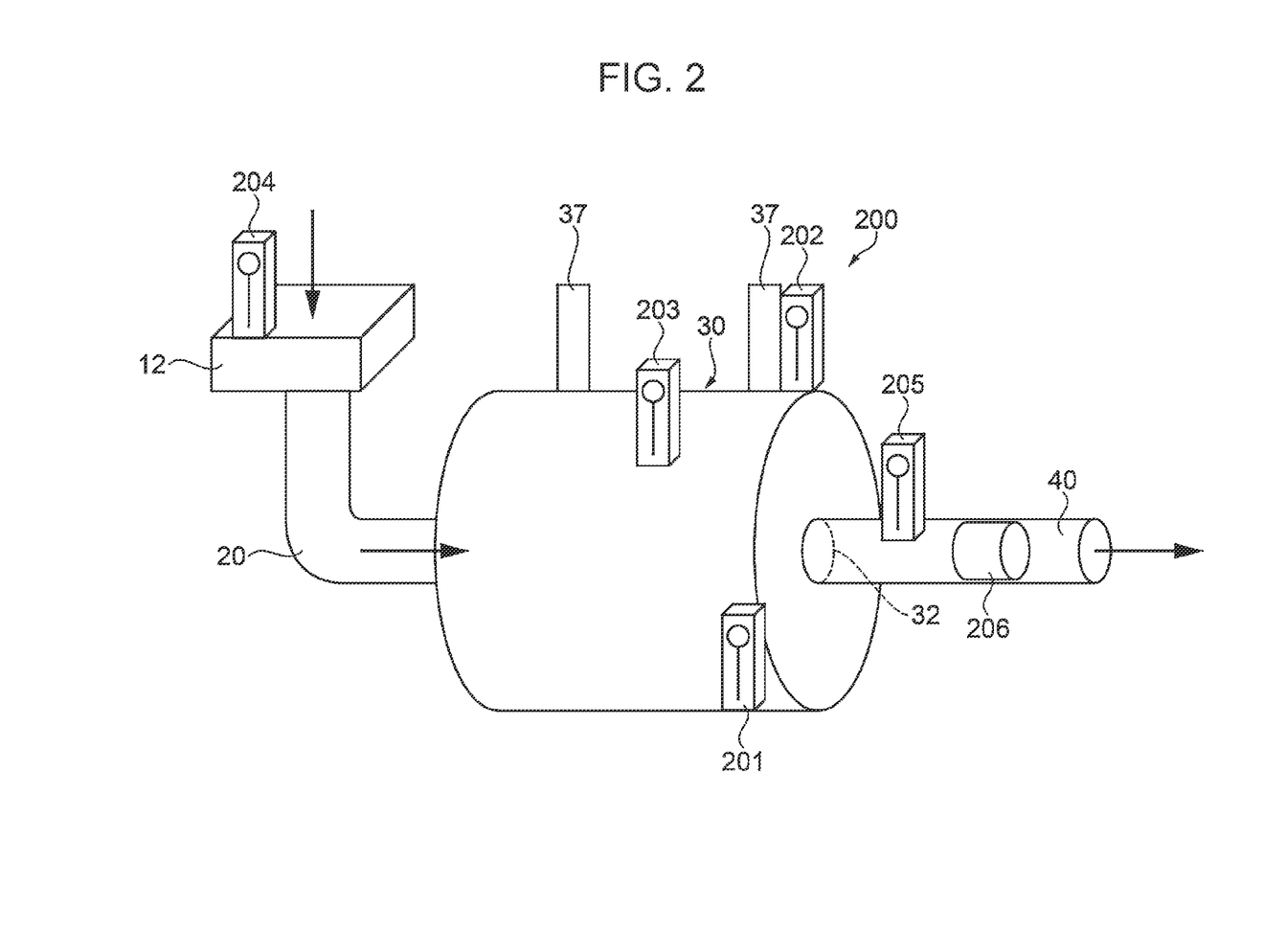
FIG. 2 is a diagram that illustrates a defibrator and its neighborhood according to a first embodiment.

FIG. 2 is a diagram that illustrates the defibrator 30 and its neighborhood. The hopper 12, the inlet pipe 20, the defibrator 30, water-cooling pipes 37 for cooling the defibrator 30, and a temperature acquisition unit 200 are illustrated in FIG. 2.

The temperature acquisition unit 200 includes a first thermometer 201 for measuring the internal temperature of the defibrator 30, a second thermometer 202 for measuring the temperature of the water-cooling pipe 37, a third thermometer 203 for measuring the ambient temperature of the defibrator 30, a fourth thermometer 204 for measuring the entrance temperature of the defibrator 30, a fifth thermometer 205 for measuring the exit temperature of the defibrator 30, and a flowmeter 206 for measuring the flow rate of gas (air) flowing through the transport pipe 40, etc. However, the temperature acquisition unit 200 does not necessarily have to include all of them. Any one of them may be provided alone and used for acquiring the temperature. Any two or more of them may be provided in combination and used for acquiring the temperature. Various combinations can be adopted for the temperature acquisition unit 200.

The defibrator 30 causes the control unit to pre-store control parameters at a temperature of $T_0=0°$ C. (273 K) as a standard state. For example, the rotation speed No of the defibrator 30 is approximately 3,600 rpm when the temperature is 0° C. The defibrator 30 rotates by receiving drive power via a non-illustrated belt pulley from a non-illustrated three-phase induction motor that is controlled by an inverter. Therefore, the control of the rotation speed of the defibrator 30 is achieved by controlling the number of revolutions of the three-phase induction motor.

The number of revolutions of the three-phase induction motor depends on the control frequency of the inverter connected thereto. The rotation speed of the three-phase induction motor is expressed by Formula 1 shown below.

Rotation speed of the three-phase induction motor=120×Frequency of the inverter/Number of poles of the motor  Formula 1

Assuming a standard state in which the frequency of the inverter is 40 Hz and the number of poles of the motor is four, in the first embodiment, the rotation speed of the three-phase induction motor is 1,200 rpm. Given that the rotation ratio of the three-phase induction motor to the belt pulley is 1: 3, the defibrator 30 rotates at 3,600 rpm, which is three times faster than the rotation speed of the three-phase induction motor.

The actual state is not always the standard state, that is, not always a temperature of $T_0=0°$ C. (273 K). Therefore, the rotation speed of the three-phase induction motor is controlled in accordance with the temperature.

Figure 3:
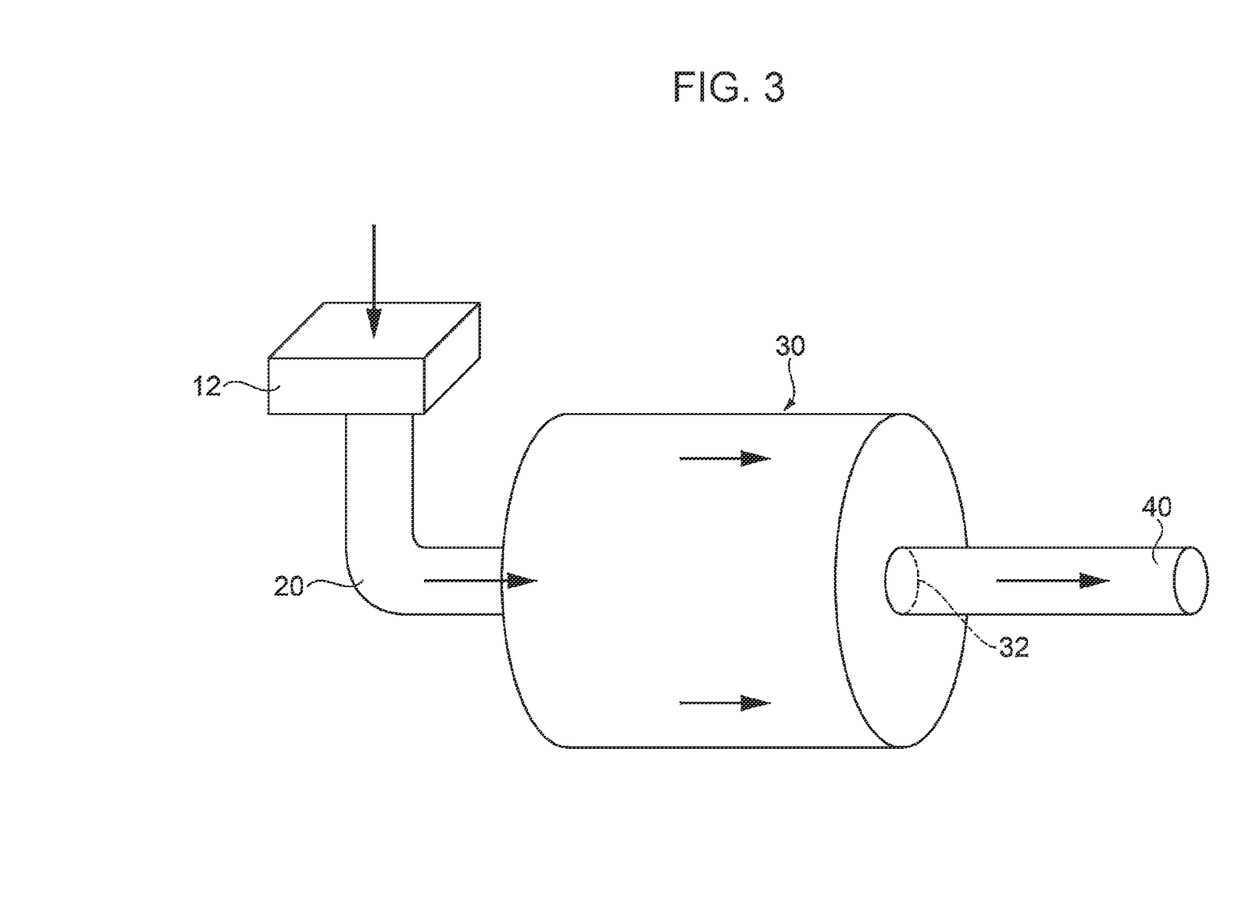
FIG. 3 is a diagram that illustrates the defibrator and its neighborhood with a decrease in the mass flow of gas (for example, air).
Figure 4:
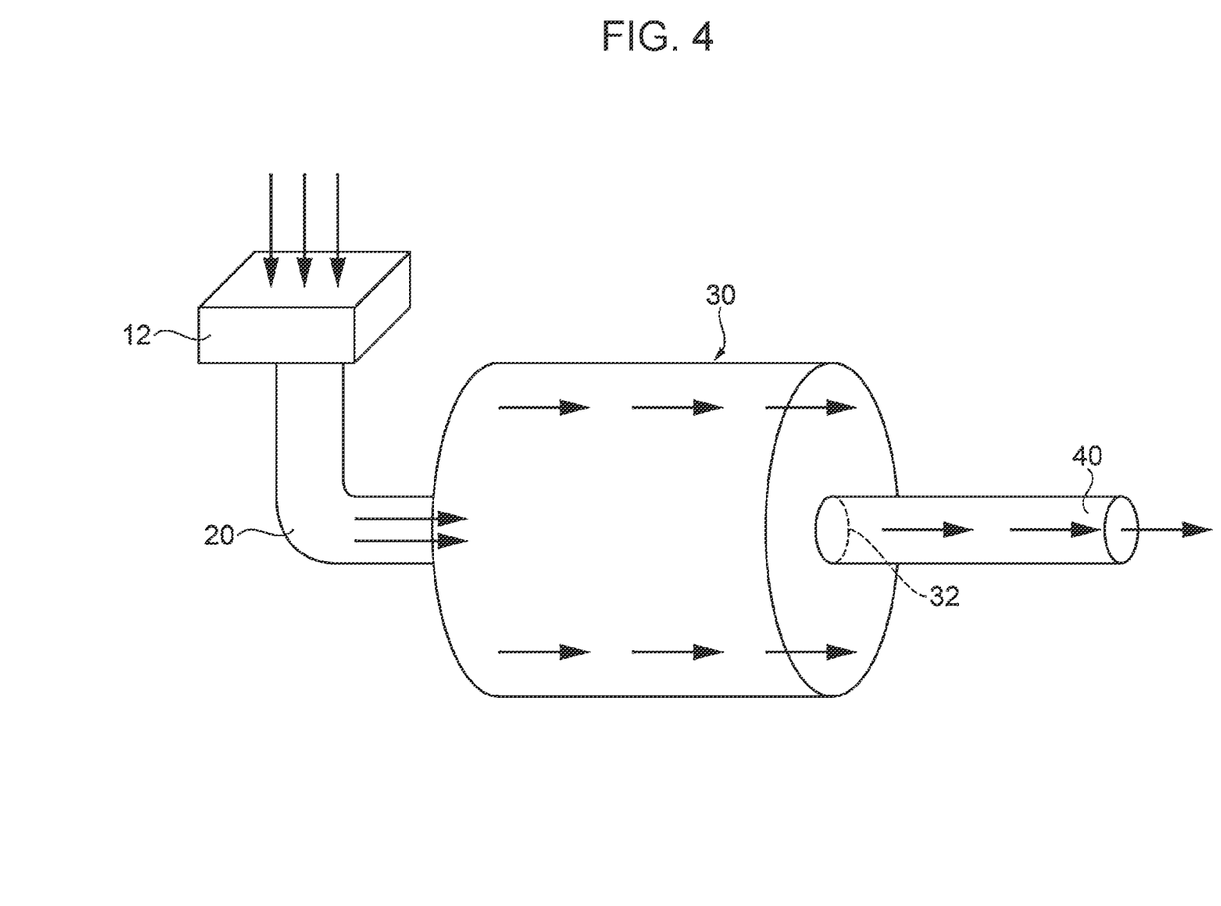
FIG. 4 is a diagram that illustrates the defibrator and its neighborhood with an increase in the mass flow of gas (for example, air).

FIG. 3 is a diagram that illustrates the defibrator 30 and its neighborhood with a decrease in the mass flow of gas (air). FIG. 4 is a diagram that illustrates the defibrator 30 and its neighborhood with an increase in the mass flow of gas (air).

In the first embodiment, the rotation speed of the three-phase induction motor is controlled in accordance with the internal temperature of the defibrator 30. Therefore, the first thermometer 201 is provided inside the defibrator 30, among the components of the temperature acquisition unit 200 illustrated in FIG. 2. For example, suppose that the internal temperature of the defibrator 30 measured by the first thermometer 201 was 0° C. when operation started, and, after a lapse of a couple of hours, the temperature has risen to 30° C. because of frictional heat inside the defibrator 30, Joule heat of the motor, etc.

By Boyle-Charles' law, as the temperature T rises, the volume of gas (air) increases to a volume value that is $T/T_0$-times as large as a volume value of the standard state. Let the volume of gas (air) under initial conditions be 100%. When the temperature rises to 30° C., the volume of the gas (air) increases to: (273+30)/273=approximately 111%. The density of gas (air) decreases when the volume of the gas (air) increases. In comparison with the standard state, the density of the gas (air) will be: 100/111=approximately 90.1%.

Since the capacity of the defibrator 30 is fixed, a certain volume of gas (air) flows out from the outlet 32 due to operation of the rotor 34 described earlier; however, the mass flow of the gas (air) decreases when the density of the gas (air) decreases. For example, if the internal temperature T of the defibrator 30 is 30° C., the mass flow of the gas (air) transported through the transport pipe 40 will be 90.1% in comparison with the standard state.

When the internal temperature of the defibrator 30 is higher than the internal temperature in the standard state, as indicated by arrows in FIG. 3, the mass flow of the gas (air) decreases, and the performance of transportation of a raw sheet material OP containing fibers (for example, waste paper) supplied to the defibrator 30 decreases. Due to the decreased transportation performance, the time of stay inside the defibrator 30 becomes longer. Such a longer stay inside the defibrator 30 excessively promotes the defibration of the raw sheet material OP, and the raw sheet material OP will be defibrated into a short fibrous form, meaning a defibrated state different from that of the standard state. To provide a solution, the flow rate of the gas (air) is increased so as to make the time of stay inside the defibrator 30 shorter and similar to that of the standard state.

The flow rate of the gas (air) discharged from the outlet 32 of the defibrator 30 is proportional to the number of revolutions of the rotor 34. Therefore, if the number of revolutions of the rotor 34 of the defibrator 30 is increased, the flow rate of the gas (air) also increases.

For example, since the number of revolutions of the rotor 34 of the defibrator 30 in the standard state is 3,600 rpm, it is possible to compensate for the decrease in the mass flow of the gas (air) by increasing the number of revolutions of the rotor 34 to 3,600/0.901=approximately 3,996 rpm. This means that the number of revolutions of the three-phase induction motor should be set to be 1,332 rpm, which is one third of the number of revolutions of the rotor 34. Therefore, the control frequency of the inverter should be set to be 44.4 Hz.

As explained above, when the internal temperature of the defibrator 30 rises to become higher than the internal temperature in the standard state, the control frequency of the inverter is made higher in accordance with the temperature acquired by the first thermometer 201 of the temperature acquisition unit 200, thereby increasing the number of revolutions of the three-phase induction motor and increasing the number of revolutions of the rotor 34. Since the number of revolutions is increased, the flow rate of the gas (air) discharged from the outlet 32 of the defibrator 30 also increases; controlling the mass flow of the gas (air) that contains the defibrated fibers DF transported from the defibrator 30 in this way makes it possible to keep a good defibrated state.

The temperature in the standard state can be set as desired. Therefore, the internal temperature of the defibrator 30 could be lower than the internal temperature in the standard state. When the internal temperature of the defibrator 30 is lower than the internal temperature in the standard state, as indicated by arrows in FIG. 4, the mass flow of the gas (air) increases, and the performance of transportation of a raw sheet material OP containing fibers (waste paper) supplied to the defibrator 30 increases. Due to the increased transportation performance, the time of stay inside the defibrator 30 becomes shorter. The shorter stay of the raw sheet material OP (waste paper) inside the defibrator 30 makes it more difficult for the raw sheet material OP containing fibers (waste paper) to be defibrated, resulting in defibration into a long fibrous form, meaning a defibrated state different from that of the standard state. To provide a solution, the flow rate of the gas (air) is decreased so as to make the time of stay inside the defibrator 30 longer and similar to that of the standard state.

As explained above, when the internal temperature of the defibrator 30 is lower than the internal temperature in the standard state, the control frequency of the inverter is made lower in accordance with the temperature acquired by the first thermometer 201 of the temperature acquisition unit 200, thereby decreasing the number of revolutions of the three-phase induction motor and decreasing the number of revolutions of the rotor 34. Since the number of revolutions is decreased, the flow rate of the gas (air) discharged from the outlet 32 of the defibrator 30 also decreases; controlling the mass flow of the gas (air) that contains the defibrated fibers DF transported from the defibrator 30 in this way makes it possible to keep a good defibrated state.

Real-time correction may be performed by always measuring the temperature by the first thermometer 201 during the operation of the defibrator 30 and by always controlling the number of revolutions of the three-phase induction motor.

In the first embodiment, only the first thermometer 201 inside the defibrator 30 is used among those illustrated in FIG. 2. In the second embodiment, at least one measurement value of the second thermometer 202 for measuring the temperature of the water-cooling pipe 37, the third thermometer 203 for measuring the ambient temperature of the defibrator 30, the fourth thermometer 204 for measuring the entrance temperature of the defibrator 30, and the fifth thermometer 205 for measuring the exit temperature of the defibrator 30 is used. The internal temperature of the defibrator 30 may be computed based on the measurement value or may be found by looking up a data table prepared in advance.

Alternatively, an average of the measurement value of the first thermometer 201 inside the defibrator 30, the measurement value of the fourth thermometer 204 for measuring the entrance temperature of the defibrator 30, and the measurement value of the fifth thermometer 205 for measuring the exit temperature of the defibrator 30 may be used. Since using the average of them makes it possible to know the average temperature of the gas (air) throughout the entire process of the defibrator 30, it is possible to control the number of revolutions of the three-phase induction motor more precisely.

As the third embodiment, the measurement value of the flowmeter 206 for measuring the flow rate of gas (air) flowing through the transport pipe 40 may be used, and the internal temperature of the defibrator 30 may be computed based on the measurement value or may be found by looking up a data table prepared in advance.

Next, the fourth embodiment will now be explained. In the fourth embodiment, the flow rate of gas (air) is adjusted by controlling the suction force applied by the suction device 110.

The suction device 110 generates airflow directed downward in the vertical direction to suck, onto the mesh belt 122, the mixed defibrated material containing the defibrated fibers DF dispersed in the gas (air).

In the standard state of T=T0, the transportation speed of the belt is 0.48 m/min, and the suction airflow rate of the suction device 110 is 5 m³/min.

For example, since the mass flow of the gas (air) decreases to 90.1% when the internal temperature of the defibrator 30 rises to 30° C., it is possible to compensate for the decrease in the mass flow of the gas (air) by setting the airflow rate of the suction device 110 to be 5/0.901=approximately 5.55 m³/min. The suction device 110 operates under inverter control, similarly to the defibrator 30. Therefore, it is possible to offset the effect of the temperature rise by controlling the inverter into a frequency obtained by multiplying the standard frequency of the inverter by 100/90.1=approximately 1.11.

As explained above, a fiber structure manufacturing apparatus and a fiber structure manufacturing method according to an exemplary embodiment of the present disclosure controls the mass flow of gas (air) that contains a defibrated material transported from a defibration unit in accordance with a temperature inside the defibration unit. Therefore, it is possible to reproduce a high-quality fiber structure (for example, recycled paper) that is in a good defibrated state.

The embodiments shall not be construed to unduly limit the scope of the present disclosure. Namely, although the embodiments contain specific detailed explanations for the purpose of showing examples, a person skilled in the art will understand that various variations and modifications can be applied to the detailed content without going beyond the scope of the present disclosure. Therefore, exemplary embodiments of the present disclosure are described above without impairing the generality of the claimed aspects of the disclosure and without adding any limitation thereto.

What is claimed is:
1. A fiber structure manufacturing apparatus, comprising:
a defibration unit that pulverizes and defibrates a raw sheet material that contains fibers;
a transportation unit that transports a defibrated material after defibration by the defibration unit;

a forming unit that forms a fiber structure from the defibrated material transported by the transportation unit;

a temperature acquisition unit that acquires a temperature inside the defibration unit; and a control unit that controls a mass flow of gas that contains the defibrated material transported from the defibration unit in accordance with the temperature acquired by the temperature acquisition unit.

2. The fiber structure manufacturing apparatus according to claim 1, wherein the control unit increases the mass flow of the gas that contains the defibrated material transported from the defibration unit when the temperature acquired by the temperature acquisition unit is higher than a predetermined temperature.

3. The fiber structure manufacturing apparatus according to claim 1, wherein the defibration unit includes a rotor that has rotary blades and a stator that has stationary blades and is provided around the rotor, and the control unit controls a number of revolutions of the rotor.

4. The fiber structure manufacturing apparatus according to claim 1, wherein the forming unit includes a dispersion mechanism that disperses the defibrated material transported by the transportation unit in a gaseous atmosphere, a suction mechanism that sucks the defibrated material dispersed by the dispersion mechanism, and a mesh belt that transports the defibrated material sucked by the suction mechanism, and the control unit controls a suction force applied by the suction mechanism.

5. The fiber structure manufacturing apparatus according to claim 1, wherein the temperature acquisition unit measures the temperature inside the defibration unit.

6. The fiber structure manufacturing apparatus according to claim 1, wherein, based on a measurement value of a temperature at an entrance of the defibration unit and a measurement value of a temperature at an exit of the defibration unit, the temperature acquisition unit acquires the temperature inside the defibration unit.

7. The fiber structure manufacturing apparatus according to claim 1, wherein, based on a flow rate of the gas at an exit of the defibration unit, the temperature acquisition unit acquires the temperature inside the defibration unit.

* * * * *